United States Patent
Ribour et al.

(10) Patent No.: US 7,851,395 B2
(45) Date of Patent: Dec. 14, 2010

(54) CONTROLLED DISTRIBUTION OF STEREOSPECIFIC SITES IN ZIEGLER-NATTA CATALYST SYSTEMS

(75) Inventors: David Ribour, Mons (BE); Roger Spitz, Lyons (FR); Jerome Gromada, Marchovelette (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 0 days.

(21) Appl. No.: 12/296,955

(22) PCT Filed: Apr. 4, 2007

(86) PCT No.: PCT/EP2007/053290

§ 371 (c)(1),
(2), (4) Date: Sep. 9, 2009

(87) PCT Pub. No.: WO2007/115994

PCT Pub. Date: Oct. 18, 2007

(65) Prior Publication Data

US 2010/0056736 A1 Mar. 4, 2010

(30) Foreign Application Priority Data

Apr. 12, 2006 (EP) .................................. 06290630

(51) Int. Cl.
*B01J 31/00* (2006.01)
*B01J 37/00* (2006.01)
*B01J 27/135* (2006.01)
*C08F 4/02* (2006.01)
*C08F 4/60* (2006.01)

(52) U.S. Cl. .................... 502/107; 502/104; 502/115; 502/116; 502/126; 502/134; 502/226; 502/227

(58) Field of Classification Search ................ 502/107, 502/104, 115, 116, 126, 134, 227; 526/907
See application file for complete search history.

(56) References Cited

U.S. PATENT DOCUMENTS

| 4,829,037 A * | 5/1989 | Terano et al. ............... 502/112 |
| 5,188,997 A * | 2/1993 | Luciani et al. .............. 502/107 |
| 2005/0003953 A1 * | 1/2005 | Chen et al. .................. 502/118 |

FOREIGN PATENT DOCUMENTS

| EP | 0474249 A | 3/1992 |
| EP | 0504744 A | 9/1992 |

* cited by examiner

Primary Examiner—David Wu
Assistant Examiner—Elizabeth Eng
(74) Attorney, Agent, or Firm—Tenley R. Krueger

(57) ABSTRACT

This invention relates to an improved method for improving the tacticity of Ziegler-Natta catalyst systems and for controlling the behaviour of the active stereospecific sites.

6 Claims, No Drawings

CONTROLLED DISTRIBUTION OF STEREOSPECIFIC SITES IN ZIEGLER-NATTA CATALYST SYSTEMS

CROSS-REFERENCE TO RELATED APPLICATIONS

This application claims the benefit of PCT/EP2007/053290, filed Apr. 4, 2007, which claims the benefit of EP 06290630.0, filed Apr. 12, 2006.

This invention relates to an improved method for improving the tacticity of Ziegler-Natta catalyst systems and for controlling the behaviour of the active stereospecific sites.

Ziegler-Natta catalyst systems are multi-site catalyst systems that typically produce polymers having a mixture of chains having different tacticities, an heterogeneous composition and properties linked to crystallisation that are not optimal. A large effort was spent to improve the activity and tacticity of these catalyst systems. The last generations of Ziegler-Natta catalyst system have an excellent productivity and the addition of a Lewis base allows the selection of isospecific sites having a high isotactic index, but they still leave a diversity of sites, both in stereospecificity and in kinetic parameters.

Metallocene and post-metallocene catalyst systems on the contrary are single site catalyst systems that produce often a narrow composition distribution and uniform crystallisation but these catalysts systems are costly and difficult to prepare.

In today's polymer production, the $MgCl_2/TiCl_4$ catalyst system is largely used to prepare polyethylene and polypropylene leaving a very limited part to metallocene catalyst systems.

Conventional Ziegler-Natta catalyst systems are typically based on $MgCl_2$, $TiCl_4$ and internal Lewis base or their precursors and they are activated with $AlR_3$ and eventually an external Lewis base.

It is thus very desirable to prepare Ziegler-Natta catalyst systems that offer some of the advantages of single site catalyst systems but are easier and less costly to prepare than the currently available single site systems.

It is an aim of the present invention to provide a method for improving the tacticity of Ziegler-Natta catalyst systems.

It is also an aim of the present invention to prepare modified Ziegler-Natta catalyst system having a controlled behaviour.

It is another aim of the present invention to produce modified Ziegler-Natta catalyst systems that have and keep a good activity.

It is yet another aim of the present invention to reduce the polydispersity of polymers prepared with Ziegler-Natta catalyst systems.

The present invention reaches, at least partially, one or more of these aims.

Accordingly, the present invention provides a method for activating a Ziegler-Natta pre-catalyst component by adding a Lewis acid that is a metal compound soluble in apolar or polar solvents, preferably in apolar solvents.

In a preferred embodiment, the present invention provides a method for activating a Ziegler-Natta pre-catalyst component that comprises the steps of:
a) providing a Ziegler-Natta pre-catalyst component;
b) optionally extracting a fraction of the titanium sites by thermal treatment for instance under vacuum;
c) treating the pre-catalyst by adding a Lewis acid $MX_n$ that is a compound soluble in apolar or polar solvents, preferably in apolar solvents, wherein M is Sn, Si, B, Ga, or Sb, preferably Si or Sn, wherein X is halogen or alkyl group, and wherein n is the valence of M;
d) optionally further treating the Ziegler-Natta pre-catalyst component with a titanium compound $TiX_4$ before or after step c);
e) adding aluminium alkyl of general formula $AlR_nZ_{3-n}$ wherein R is alkyl group having from 1 to 10 carbon atoms, Z is halogen and n is 0, 1, 2 or 3;
f) optionally adding an external electron donor $SiR^a{}_m(OR^b)_{4-m}$ wherein $R^a$ and $R^b$ are each independently selected from alkyl, aryl, cycloalkyl, arylalkyl or alkylaryl having at most 12 carbon atoms, and two neighbouring Rs can be linked together to make a ring, and m is 0 or an integer from 1 to 4.

In this invention, the Ziegler-Natta pre-catalyst or finished Ziegler-Natta pre-catalyst is meant to be a ready-to-use catalyst component. It comprises magnesium, titanium and enough chlorine to fully chlorinate Mg and Ti into $MgCl_2$ and $TiCl_4$. It further includes internal electron donor(s) that comprise at least two distinct oxygen-containing functions. Suitable internal electron donors can be selected for example from di-esters such as phthalate and succinate or from di-ethers.

The Ziegler-Natta pre-catalyst can be phthalate-based, or succinate-based or gamma diether-based pre-catalyst.

Preferably X is Cl, Br, F or $C_2H_5$, more preferably it is Cl.

New internal Lewis bases such as gamma-diethers can also be used as external Lewis base or as external electron donors. They are represented by general formula

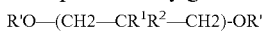

wherein each R', $R^1$ and $R^2$ are each independently selected from alkyl, aryl, cycloalkyl, arylalkyl or alkylaryl having at most 12 carbon atoms, and $R^1$ and $R^2$ can be linked together to make a ring or rings. Preferably both R' are the same and are CH3. Among preferred $R^1$ and $R^2$ one can cite isobutyl or cyclopentyl. A preferred gamma-diether is fluorenyl-based diether.

The method according to the present invention results maintains or slightly improves the activity of the catalyst system as measured in amount of polymer produced per gram of catalyst system and considerably reduces the amount of atactic polymer.

The addition of $MX_n$ to the Ziegler-Natta pre-catalyst has no adverse consequences on the polymers properties.

The thermal treatment is carried out either under vacuum or under inert gas such as nitrogen, helium, argon, at a temperature larger than 80° C., typically of from 80 to 150° C., preferably at a temperature of about 120° C. and for a period of time of from 2 to 6 hours, preferably of about 4 hours. It is carried out under good vacuum, preferably of the order of $10^{-10}$ bars. Such treatment removes a fraction of the titanium sites; it does not remove the internal base and thus does not lead to any degradation of the catalyst component up to temperatures of 150° C. under good vacuum.

A Lewis acid may act as poison, when added either simultaneously with or after the activating agent, during the preparation of an active Ziegler-Natta catalyst system. It can also act as poison when used during polymerisation. Surprisingly, in the present invention, it acts as activator of the remaining titanium sites when added prior to the activating agent.

The Lewis acid $MX_n$ is a halogenated or alkylated Si or Sn compound that is soluble in apolar solvents, does not interfere with the internal Lewis base used to prepare the pre-catalyst, and is colourless. The most preferred Lewis acids are $SiCl_4$ and $SnCl_4$. The size of and the oxidation state of metal M play a role on the distribution and activation of the active sites. Si and Sn give the best performance for reducing the amount of atactic polymer while keeping a reasonable productivity.

Similarly, other halogens or alkyl groups have been tested for X, but chlorine gives the best results: the activities obtained with various X can be ranked as follows: Cl>Br>F>Ethyl.

Optionally a double pre-treatment can be carried out with $TiX_4$ and $MX_n$ before adding the aluminium alkyl activating agent: it results in an improvement of activity.

Without wishing to be bound by a theory, it is believed that the Ziegler-Natta pre-catalyst consists of a combination of active titanium sites and of activating titanium sites. The thermal treatment removes part of the activating titanium sites. The subsequent Lewis acid treatment fills the vacated titanium sites with improved Si or Sn activating sites. It is also believed that the active titanium sites are not isolated but are found in aggregates of at least two titanium sites, wherein some active titanium sites may also be replaced by Si or Sn sites.

The finished pre-catalyst component is prepared according to methods well known in the art such as described for example in EP-728769 or WO03/076480 for diether-based catalysts or in US2003/0060581 for succinate- or phthalate-based catalysts. Typically, the amount of titanium in the finished pre-catalyst component is of from 1 to 4 wt %, preferably it is of the order of 2 wt %.

The Lewis acid $MX_n$ is preferably diluted in a suitable solvent and added to the pre-catalyst. The compound is then heated from the starting temperature to a temperature of from 10 to 120° C., preferably to a temperature of from 20 to 100° C., more preferably to temperature of about 90° C. and for a period of time of from 5 minutes to 4 hours, preferably 10 minutes to 2 hours. It is then dried at room temperature for a period of time of from 30 minutes to 3 hours, preferably of about 1 hour.

If the treatment with Lewis acid $MX_n$ wherein M is Si or Sn is carried out for a long period of time of typically about 2 hours and at high temperature, typically of about 90° C., all types the phthalate-based Ziegler-Natta pre-catalysts show an improved tacticity and a reasonable productivity in the polymerisation of propylene.

The amount of added Lewis acid $MX_n$ is preferably selected to have M/Ti ratio of less than 30. More preferably the ratio M/Ti is less than 5, most preferably it is less than 1. At such small levels of added Lewis acid, the activity is maintained and the amount of atactic polymer is substantially reduced. Larger amounts of Lewis acid may have adverse effects and poison the catalyst for some metals such as Ga or Sb.

The temperature at which the treatment is carried out plays an important role in the productivity of the finished catalyst system: the higher the temperature, the higher the catalyst productivity.

The length of the treatment plays no significant role and the treatment can thus be limited to at most 2 hours without adverse consequences.

The monomer pressure has a positive influence on the catalyst productivity: the higher the pressure, the higher the productivity.

The present invention also discloses the active modified Ziegler-Natta catalyst system obtained by the method described hereabove.

The activating agent and external donor are those that are typically used with conventional Ziegler-Natta catalysts. The activating agent of formula $AlR_nZ_{3-n}$ is preferably aluminium alkyl, more preferably triethyl aluminium (TEA). The external electron donor is alkoxy-silane $SiR^a_m(OR^b)_{4-m}$, a more preferred being dicyclopentyldimethoxysilane (DCPDMS).

The present invention further discloses a method for homo- or co-polymerising ethylene or alpha olefins that comprises the steps of:
 a) injecting the active modified Ziegler-Natta catalyst system into the reactor;
 b) injecting monomer and optional comonomer into the reactor;
 c) maintaining under polymerisation conditions;
 d) retrieving a polymer.

The polymerisation results show a substantial decrease in the amount of atactic polymer without loss of productivity.

The preferred monomer is propylene and the preferred comonomers that can be used with the modified Ziegler-Natta catalyst system of the present invention, in the copolymerisation of propylene, are ethylene and hexene.

EXAMPLES

Propylene Polymerisation

Example 1

A commercial Ziegler-Natta pre-catalyst prepared with a phthalate internal Lewis base was used as starting material.

The pre-catalyst underwent a thermal treatment under vacuum at a temperature of 120° C. that removed 35% of titanium and for a period of time of 4 hours. It was then treated with $MCl_4$ at a temperature of 90° C., during a period of time of 2 hours, and with a M/Ti ratio of 31 and wherein M was Sn and Si. The polymerisation was carried out in 500 mL of heptane. The cocatalyst was triethylaluminium (TEA) at a concentration of 3 mmol/L and Al/Ti ratio of 250. The propylene monomer was injected to maintain a pressure of 4 bars during the polymerisation reaction, the polymerisation temperature was of 70° C., and 57 cm³ of hydrogen were also injected in the reactor. The results are displayed in Table I.

TABLE I

| Lewis acid | Prod. g/g/90 min | I.I. % | Tm ° C. | Mn g/mol | Mw g/mol | Mw/Mn |
|---|---|---|---|---|---|---|
| no | 7550 | 98.0 | 164.1 | 42600 | 318200 | 7.5 |
| no therm. treat. | 1420 | 96.5 | 164.2 | 52500 | 302300 | 5.8 |
| $SnCl_4$ | 1920 | 98.7 | 163.1 | 53400 | 317000 | 5.9 |
| $SiCl_4$ | 7530 | 98.7 | 163.3 | 48700 | 324300 | 6.7 |

It must be noted that after thermal treatment, the productivity of the same catalyst system is reduced to 1420 g/g/90 min instead of the starting productivity of 7550 g/g/90 min because the thermal treatment has removed about 35% of titanium form the pre-catalyst's surface. Both the $SnCl_4$ and $SiCl_4$ treatments have thus increased the productivity of the thermally treated catalyst system. The main results are:
 the amount of atactic polymer is reduced by at least 30%;
 the number average molecular weight is increased; and
 the polydispersity index is reduced.

The polydispersity index is defined by the ratio Mw/Mn of the weight average molecular weight Mw to the number average molecular weight Mn. The molecular weight are determined by gel permeation chromatography (GPC). The melting temperature Tm is determined by DSC calorimetry as measured at the peak of fusion and the isotactic index (I.I.) is the fraction of the total polymer produced insoluble in boiling heptane.

The polymers prepared more particularly with $SnCl_4$ or $SiCl_4$ have a very high isotactic index and thus an excellent rigidity, simultaneously with a polydispersity index of from 5.9 to 6.7 and thus sufficiently large to allow a good processablity.

Example 2

The pre-catalyst was treated with $MCl_4$ at a temperature of 90° C. and with a M/Ti ratio of 0.2 or 1.0 and wherein M was Sn and Si. The polymerisation was carried out in 500 mL of heptane. The cocatalyst was triethylaluminium (TEA) at a concentration of 3 mmol/L and Al/Ti ratio of 250. The propylene monomer was injected to maintain a pressure of 4 bars during the polymerisation reaction, the polymerisation temperature was of 70° C., and 57 $cm^3$ of hydrogen were also injected in the reactor. The results are displayed in Table 2.

TABLE II

| Lewis acid | M/Ti | Prod. g/g/90 min | I.I. % | Tm ° C. | Mn g/mol | Mw g/mol | Mw/Mn |
|---|---|---|---|---|---|---|---|
| — | 0 | 7550 | 98.0 | 164.1 | 42600 | 318200 | 7.5 |
| $SnCl_4$ | 0.2 | 7550 | 98.6 | 163.8 | 69600 | 383400 | 5.5 |
| $SiCl_4$ | 0.2 | 7290 | 98.3 | 164.1 | 81900 | 389900 | 4.8 |
| $SnCl_4$ | 1.0 | 7440 | 98.9 | 165.6 | 64800 | 422800 | 6.5 |
| $SiCl_4$ | 1.0 | 5920 | 99.1 | 162.8 | 75400 | 377300 | 5.0 |

The invention claimed is:

1. A method for activating a Ziegler-Natta pre-catalyst component comprising:
    providing a finished Ziegler-Natta pre-catalyst component, wherein the Ziegler-Natta pre-catalyst component comprises magnesium, titanium, an amount of chlorine sufficient to fully chlorinate Mg and Ti to form $MgCl_2$ and $TiCl_4$ and internal electron donor(s) that comprise at least two distinct oxygen-containing functions;
    submitting the pre-catalyst to a thermal treatment carried out at a temperature of from 80 to 150° C. under vacuum of about $10^{-10}$ bars;
    treating the pre-catalyst by adding a Lewis acid $MX_4$ soluble in apolar solvents wherein M is Si or Sn and wherein X is halogen or alkyl group;
    optionally further treating the Ziegler-Natta pre-catalyst component with a titanium compound $TiX_4$ before or after treating;
    adding aluminum compound of general formula $AlR_nZ_{3-n}$ wherein R is alkyl group having from 1 to 10 carbon atoms, Z is halogen and n is 0, 1, 2 or 3; and
    optionally adding an external electron donor either of general formula $SiR^a{}_m(OR^b)_{4-m}$ or of general formula R'O—(CH2-$CR^1R^2$—CH2)-OR' wherein $R^a$ and $R^b$ are each independently selected from alkyl, aryl, cycloalkyl, arylalkyl or alkylaryl having at most 12 carbon atoms, and two neighbouring R can be linked together to make a ring, m is 0 or an integer from 1 to 4, wherein each R', $R^1$ and $R^2$ are each independently selected from alkyl, aryl, cycloalkyl, arylalkyl or alkylaryl having at most 12 carbon atoms, and $R^1$ and $R^2$ can be linked together to make a ring or rings.

2. The method of claim 1, wherein X in the titanium compound is Cl, Br, F or $C_2H_5$.

3. The method of claim 2, wherein X in the titanium compound is Cl.

4. The method of claim 1, wherein the aluminum compound is an aluminum alkyl.

5. The method of claim 1, wherein a molar ratio M/Ti is of at most 30.

6. The method of claim 5, wherein the molar ratio M/Ti is of less than 1.

* * * * *